April 8, 1930.  C. N. GRANT  1,753,701
SAW FILING GUIDE
Filed June 3, 1927
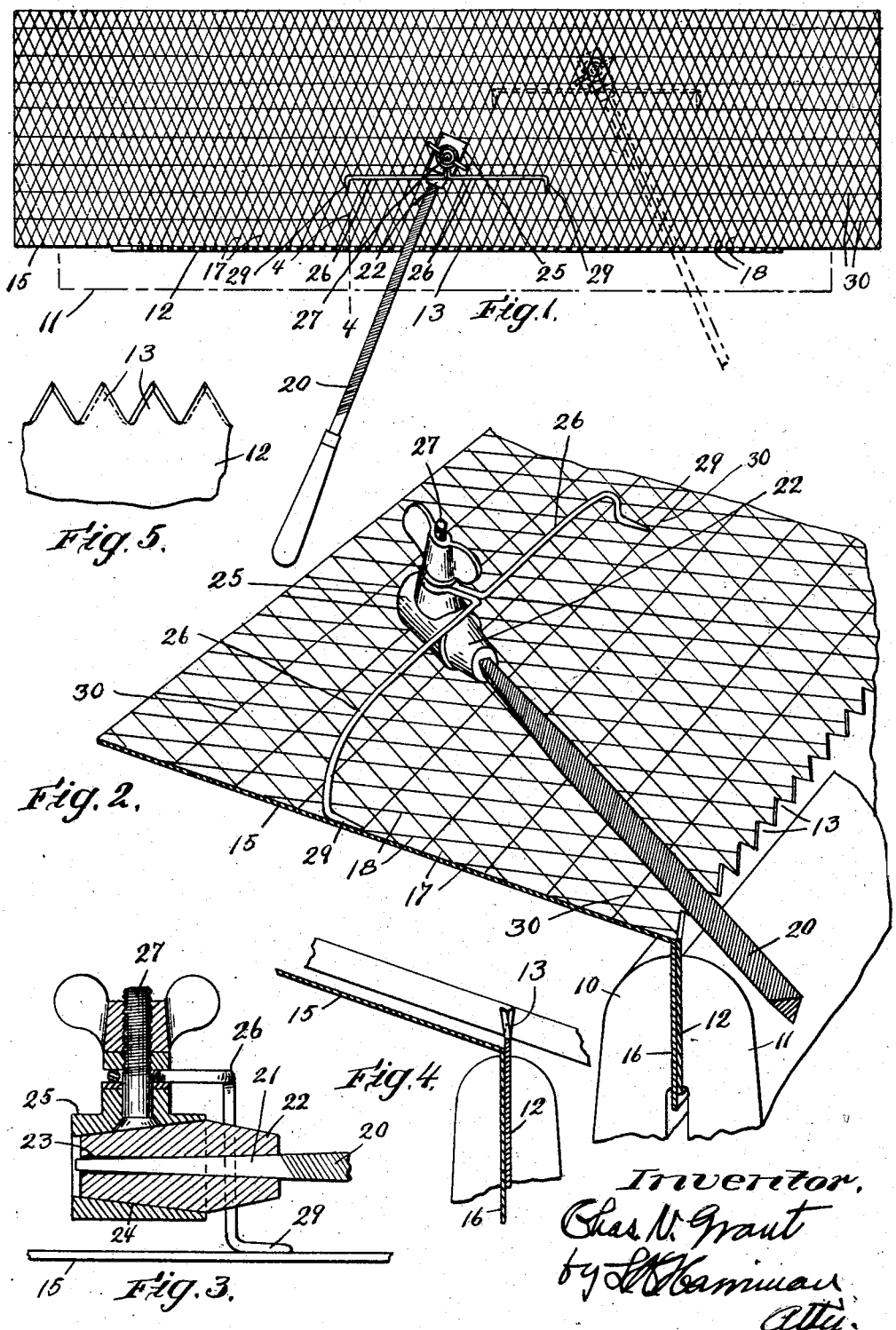

Patented Apr. 8, 1930

1,753,701

UNITED STATES PATENT OFFICE

CHARLES N. GRANT, OF HAVERHILL, MASSACHUSETTS

SAW-FILING GUIDE

Application filed June 3, 1927. Serial No. 196,375.

This invention relates to devices to be employed in filing by hand the teeth of the ordinary wood saw having the ordinary type of V-shaped teeth, the edges of the alternate teeth being oppositely beveled, so that the top edge of each tooth is inclined at the beveled side and extends to a sharp point, and the pointed ends of the alternate teeth being equidistant from a medial straight line. The teeth are also usually alternately bent slightly to opposite sides of the plane of the blade, so that the kerf which is formed will be slightly wider than the blade is thick, to prevent binding. In saws of this type, as all the cutting is done by the ends of the teeth, the beveled edges of each tooth should meet in a sharp edge at the tip and the sharp corners at each side should meet the tip edge in a sharp point. All the teeth to be effective to best advantage should also have their extreme tips lie in the same plane. While this uniformity is originally secured by machines without difficulty, great difficulty is encountered in restoring these conditions by hand with the ordinary three sided file which is usually employed.

When the teeth of such saws are sharpened by hand with a file of this form it has usually been the practice to clamp the saw in a vise with the teeth pointing upward and extending in a horizontal row. The work of restoring the teeth to their original condition, in this manner, calls for such a high degree of skill and sureness of eye on the part of the workman, that perfectly satisfactory results are seldom attained. This is largely due to the fact that, to restore the original beveled edge on the tip of each tooth, the file must be moved longitudinally at a certain oblique angle to a horizontal plane and at another certain oblique angle to a vertical plane, assuming that the saw blade is held as above indicated. Also, as the beveled face at the front side of one tooth and the beveled face at the rear side of the next tooth are filed by the same stroke, it is necessary that the file be constantly held in a certain position laterally. That is, so that a file, which is in the form of an equilateral triangle in cross section, will be constantly held in an exactly inverted position cross sectionally, or, if it be slightly tilted laterally from this position to form corresponding edges at an angle to the horizontal which is greater or less than 60°, that the extent to which it is tilted be constantly maintained at all times during the entire operation, which includes the filing of both edges of each tooth, to do which it is necessary, after filing adjacent edges from one side of the blade, to remove the blade from the clamp, reverse its lengthwise position, reclamp it and repeat the above described operation with the file held at the opposite oblique angle to the blade from the position in which the workman stands. The exact angle of the bevel on the edges is practically the same in all saws having teeth of the V-type. The chief difficulties therefore in filing by hand is primarily in determining the exact oblique angles at which the file should be held and in holding it in this position throughout the entire length of the stroke of the file.

The objects of my invention are to provide a simple form of means which are adapted for use in connection with any ordinary vise or clamp for holding the saw blade, which will enable the workman to hold and guide the file at the angles to the plane of the saw blade which correspond to the beveled faces to be restored on the edges of the teeth, and which will be adapted for ready application to an ordinary vise and file, said means to be adapted for use and adjustment according to variations in conditions which may be encountered.

I accomplish these objects by providing a table, which is adapted for arrangement at one side of the vise for holding the saw blade, which is provided with a series of direction indicating lines which will at all times enable the workman to determine readily whether he is holding and guiding the file correctly, and by providing in connection therewith a guide which is adapted to be attached to the file and to engage the surface of the table so as to cause the workman to hold the file at the correct angles horizontally and laterally in all positions of engagement with the saw teeth.

For a more complete understanding of the invention reference is made to the accompanying drawings in which:

Fig. 1 is a plan view of a preferred form of indicating and guiding device embodying my invention.

Fig. 2 is a perspective view thereof partly in section.

Fig. 3 is an enlarged detail longitudinal sectional view of the guide holding means for the file.

Fig. 4 is an enlarged detail cross-sectional view at line 4—4 of Fig. 1.

Fig. 5 is a detail side view of a portion of a common type of saw.

In the drawings 10 and 11 indicate the jaws of a common form of vise or clamp, said jaws having horizontal upper edges and being of sufficient length to clamp the saw blade 12 for a substantial portion of its length. The saw is shown as having the common V-type of teeth 13, each tooth having beveled edge faces and a tip edge 11, as shown in Fig. 5. My invention is, however, adapted for use in connection with the operation of filing saw teeth of other types, without substantial modification.

According to my invention I provide a table 15 having a flat top surface, and for the purpose of providing a convenient means for attaching the table to the vise, or for holding it in the desired relation thereto directly in the rear of the rear jaw thereof, said table is preferably made of stiff sheet metal and is provided with a flat edge flange 16 which extends throughout its length, the angle between the table and flange being slightly obtuse and said flange being adapted to be clamped between the jaws with the saw blade and at the rear side of the latter, so that the table will extend rearwardly and upwardly at a slight inclination from the rear side of the saw, which will be so clamped that the vertices of the V-notches between the teeth are a short distance above the adjacent surface of the table.

The surface of the table is provided with two series of preferably equi-spaced parallel lines 17, 18, which extend entirely across the same, the lines 17 being extended at an oblique angle to the flange 16 corresponding to the angle of the bevel of the edges of the teeth, which will be filed when the blade is in the position shown in Figs. 1 and 2, and the lines 18 being extended at the corresponding opposite angle, which corresponds to the position and inclination of the bevel of the opposite edges of the teeth when the blade is held in the opposite position from that shown. An equilateral or three cornered file 20, is provided preferably having parallel corners, except at its extreme end portion 21 opposite its handle, which is made tapering, and a holder 22, preferably of wood, is provided, having a tapering bore 23 therethrough, which is adapted to receive the tapering end portion of the file so that the holder may be firmly secured on the file, by driving it thereon. The opposite end portion 24 of the holder from that in which the file is inserted is made in trunco-conical form, so that it tapers slightly to its opposite end from the file and a metal ferrule 25 is provided, having a correspondingly tapered bore for receiving said tapering end portion 24, so that the ferrule may be tightly fitted on the holder, and, by forcing it slightly may be securely held frictionally thereon against removal or turning movement. A pair of arms 26 are formed from a continuous length of wire which is looped at its middle portion about a screw threaded bolt 27, which is mounted in and projects from one side of the ferrule 25, permitting the arms to swing about the bolt as a pivot, and a wing nut 28 is provided on said bolt for clamping the arms to the ferrule in the angular position with relation thereto, to which said arms may be adjusted. The arms 26 are extended directly oppositely from the ferrule, at nearly right angles thereto, and downwardly at their end portions, and then right angularly, to form foot portions 29, at their ends.

In using the above described attachments, the table 15 and saw blade 12 are clamped as already described, and the holder 22 is driven securely onto the file.

The ferrule 25 is then driven onto the holder 22, but, before it is secured in position thereon, its exact position with reference to the file surfaces to be used must be determined. This may be done by means of a suitable gage, or, as conveniently, the file may be laid in one of the notches between the teeth of the saw in the exact position in which it should be held when filing, with the feet 29 of the arms 26 resting on the surface of the table, and their ends in a line parallel to the saw blade. The arms will then be clamped to the ferrule by the nut 28 and the ferrule will be driven onto the holder while the parts are in this position, as shown in Figs. 1, 2 and 3. When the file is placed in a notch between two teeth to set the ferrule on the holder, it will be so placed that one of its sides lies flat against the beveled edge of one tooth and another side will lie flat against the beveled edge of the next adjacent tooth, assuming that the file is engaged with the beveled edge faces which are to be filed with the saw in the position shown, in which position the edges of the file will extend in parallelism with the lines 17 on the table, as shown in full lines in Figs. 1 and 2, and the feet 29 will be resting on the surface of the table 15.

The operation of filing the adjacent beveled sides of every other notch will then be performed in the usual manner, the workman pushing the file longitudinally while held in parallelism with one of the lines 17 and at the same time the feet 29 will be slid along on the surface of the table, the file being at all times held, while engaged with the surfaces to be filed, at a predetermined oblique angle to the saw blade, indicated by lines 17, and at another predetermined oblique angle to a horizontal plane, or in parallelism with the surface of table 15. At the same time the file will also be held against rocking laterally from a position in which its top side is in a flatwise position, unless it is desired to change the relative angular relation of the opposite edges of the teeth, or to file such edges at angles which depart slightly from the 60° angle at which the teeth are ordinarily formed. In performing this operation, the workman presses downward on the file with considerable force at the same time that he pushes it lengthwise and as irregularities are removed and the metal is cut away from the saw, a slight downward movement of the file will be permitted. In order that the approximately parallel relation of the file to the table 15 be maintained, the tip end and the handle end of the file must obviously move downward to the same extent. While the arms 26 normally support the tip end of the file at a certain distance from the table 15, said arms are of comparatively light weight resilient wire and of considerable length, so that the natural increase in downward pressure on the tip end of the file, which results from cutting away the metal of the saw, will cause the arms 26 to yield slightly to this pressure, so that the parallel relation of the file to the table 15 will be maintained. When the alternate edges of the teeth are to be filed, which are not in the position for filing shown in Fig. 2, the position in which the blade is clamped will be reversed, and the file will be placed in the dotted line position of Fig. 1, in which its edges will be parallel to lines 18 on the table, the arms being swung into parallel relation with the blade. The adjustment of the arms 26 to this position is principally desirable in that it enables them to be adjusted so that the file may be engaged with the saw near its tip, in which position the ends of the arms would both be held close to the blade, and so that the table will not have to be made wider than would otherwise be necessary to enable the arms to be held in contact therewith to the full end of the stroke with the file. This adjustment is facilitated by providing the table with lines 30 which are parallel with the saw blade. Aside from the fact that the file is moved at opposite oblique angles, the operation is the same in filing both edges of the teeth.

As a result of these operations, the beveled edges 14 at the tips of the teeth will be restored, care being taken by the workman that each edge is filed down to the same extent, so that the teeth tips will lie in approximately the same straight line.

From the foregoing description, it will be apparent that the workman may readily see whether he is holding the file at the correct angle to the blade which corresponds to the angle of the beveled faces on the edge of the teeth, while the guiding means for the tip end of the file positively holds the latter in the correct position to restore the edges at the tips of the teeth, and lateral or rocking movement of the file is, at the same time, prevented.

While the inclination of the lines 17, 18 of the table surface may be varied, the angles shown are suitable for sharpening saw teeth as ordinarily formed for a cross cut saw. Some variation therefrom, would be necessary for a rip saw, for example, but the variations which should be made may be readily determined.

I claim:

1. A guiding device for a file, adapted for use in connection with a saw holding clamp and a flat surfaced table having indicating means extending in directions corresponding to the bevel to be formed on the saw teeth, and comprising a holder adapted to be mounted on the tip end of the file and having a pair of yieldable arms mounted thereon and arranged to extend oppositely in angular relation to the file, said arms having feet at their ends arranged for sliding engagement with the table in directions parallel to the indicating means thereof, and being adapted to yield to permit the file to be pressed downward between the teeth while held in approximate parallelism with the table.

2. A guiding device for a file, adapted for use in connection with a saw holding clamp and a flat surfaced table having indicating means extending in directions corresponding to the bevel to be formed on the saw teeth, and comprising a holder adapted to be mounted on the tip end of the file and having a pair of elongated, wire arms mounted for angular adjustment thereon and arranged to extend oppositely therefrom, said arms each having a foot at its end arranged for sliding engagement with the table in parallelism with its indicating means when the file is held in filing position, and being adapted to yield to permit the file to be pressed downward while engaged with the teeth of the saw and held in parallel relation with the table.

In testimony whereof, I have signed my name to this specification.

CHARLES N. GRANT.